United States Patent [19]
Kato et al.

[11] Patent Number: 5,399,333
[45] Date of Patent: Mar. 21, 1995

[54] PROCESS FOR PRODUCING HYDROGEN PEROXIDE

[75] Inventors: Tomio Kato, Matsudo; Yukio Ishiuchi, Ushiku; Hiroshi Takamiya, Kamisu; Kazuharu Ogasawara, Kamisu; Kazuyuki Minato, Kamisu, all of Japan

[73] Assignee: Mitsubishi Chemical Gas Co., Ltd., Tokyo, Japan

[21] Appl. No.: 162,305

[22] Filed: Dec. 6, 1993

[30] Foreign Application Priority Data

Dec. 25, 1992 [JP] Japan .................................. 4-346209

[51] Int. Cl.⁶ .......................................... C01B 15/023
[52] U.S. Cl. ..................................... 423/588; 423/590
[58] Field of Search ........................ 423/588, 589, 590

[56] References Cited

U.S. PATENT DOCUMENTS

| | | |
|---|---|---|
| 2,739,042 | 3/1956 | Corey et al. |
| 2,901,490 | 8/1959 | Sprauer ............................ 423/588 |
| 3,073,680 | 1/1953 | Jenney et al. |
| 3,323,868 | 6/1967 | Ogilvie et al. |
| 3,540,847 | 11/1970 | Logan . |
| 3,752,885 | 8/1973 | Liebert et al. |
| 3,767,779 | 10/1973 | Coingt . |
| 4,514,376 | 4/1985 | Sethi . |
| 4,539,196 | 9/1985 | Sethi et al. ........................ 423/588 |

FOREIGN PATENT DOCUMENTS

| | | |
|---|---|---|
| 2003268 | 1/1970 | Germany . |
| 35-15777 | 10/1935 | Japan . |
| 37-3573 | 6/1937 | Japan . |
| 856420 | 5/1957 | United Kingdom . |
| 1390408 | 7/1972 | United Kingdom . |

OTHER PUBLICATIONS

"Selectivity Aspects of the Hydrogenation Stage of the Anthraquinone Process for Hydrogen Peroxide Production", Berglin et al., 1982 American Chemical Society, pp. 150–153.

*Primary Examiner*—Wayne Langel
*Attorney, Agent, or Firm*—Wenderoth, Lind & Ponack

[57] ABSTRACT

A process for producing hydrogen peroxide by subjecting a working solution containing anthraquinones as the reaction medium, to reduction and oxidation alternately, which process is characterized in that (1) the anthraquinones as the reaction medium contained in the working solution are a mixture of an alkyl-substituted anthraquinone and an alkyl-substituted tetrahydroanthraquinone, (2) in the reduction step, the total amount of the alkyl-substituted tetrahydroanthraquinone in the working solution and part or the total amount of the alkyl-substituted anthraquinone in the working solution are reduced, and (3) in the working solution after the reduction step, the content of the alkyl-substituted anthrahydroquinone formed is kept higher than the content of the alkyl-substituted tetrahydroanthrahydroquinone formed.

10 Claims, 1 Drawing Sheet

PROCESS FOR PRODUCING HYDROGEN PEROXIDE

FIELD OF THE INVENTION

The present invention relates to an improved process for producing hydrogen peroxide continuously by subjecting anthraquinones contained in a working solution, to reduction and oxidation repeatedly. More particularly, the present invention relates to a process for producing hydrogen peroxide efficiently by (1) using, as the reaction medium, a mixture of an alkyl-substituted anthraquinone and an alkyl-substituted tetrahydroanthraquinone (hereinafter, they are referred to simply as anthraquinone and tetrahydroanthraquinone, respectively, in some cases), (2) in the reduction step, reducing the total amount of tetrahydroanthraquinone and then reducing part or the total amount of anthraquinone, and (3) in the working solution after the reduction operation, controlling the content of the alkyl-substituted anthrahydroquinone formed, at a level higher than the content of the alkyl-substituted tetrahydroanthrahydroquinone formed (hereinafter, the alkyl-substituted anthrahydroquinone and the alkyl-substituted tetrahydroanthrahydroquinone are referred to simply as anthrahydroquinone and tetrahydroanthrahydroquinone, respectively, in some cases).

PRIOR ART

The main process for industrial production of hydrogen peroxide currently in use is an autoxidation process using anthraquinone or tetrahydroanthraquinone (hereinafter, the are referred to as anthraquinones) as the reduction medium. In general, the anthraquinones are used by dissolving them in an appropriate organic solvent. The organic solvent may be a single organic solvent or a mixed organic solvent, but is ordinarily a mixture of two organic solvents. The solution obtained by dissolving the anthraquinones in the organic solvent is called "working solution".

In the autoxidation process, a working solution containing anthraquinones is reduced with hydrogen in the presence of a catalyst to form anthrahydroquinones. Then, the anthrahydroquinones are oxidized with air or an oxygen-containing gas to reconvert the anthrahydroquinones into anthraquinones and simultaneously form hydrogen peroxide. The hydrogen peroxide formed in the working solution is ordinarily separated by extraction with water, and the working solution after hydrogen peroxide separation is resubjected to the above reduction step. Thus, a cyclic process is conducted. This process produces hydrogen peroxide substantially from hydrogen and air and is very efficient. This cyclic process is already in use for industrial production of hydrogen peroxide.

In this cyclic process, the working solution containing anthraquinone is circulated for repeated use and anthraquinone is subjected to hydrogenation at the nucleus, whereby tetrahydroanthraquinone is formed and is increasingly accumulated in the working solution. This tetrahydroanthraquinone, similarly to anthraquinone, is capable of forming hydrogen peroxide by being reduced and oxidized.

Many proposals have been made for the proportions of tetrahydroanthraquinone and anthraquinone present in working solution. In U.K. Patent No. 856420, it was proposed to increase the proportion of tetrahydroanthraquinone to the total amount of anthraquinone and tetrahydroanthraquinone (hereinafter referred to as anthraquinones amount) in working solution, to at least 80% and, in the reduction step, reduce 55% or less thereof. In the literature, it was pointed out that the case using tetrahydroanthraquinone as a reaction medium, as compared with the case using anthraquinone as a reaction medium, is advantageous because it gives a smaller amount of deterioration products. In U.S. Pat. No. 3,073,680, it was proposed, for the same reason as above, to increase the proportion of tetrahydroanthraquinone to at least 85% and reduce 55–75% thereof. In U.S. Pat. No. 3,767,779, it was proposed to increase the proportion of tetrahydroanthraquinone to as high as 90% and reduce 80–90% thereof. In U.S. Pat. No. 3,540,847, it was proposed to control the content of tetrahydroanthraquinone preferably at least 35% of the content of anthraquinone and control the reduction level preferably below the content of tetrahydroanthraquinone. In U.K. Patent No. 1390408, it was proposed to use two amylanthraquinone isomers in the forms of tetrahydroanthraquinone and anthraquinone, respectively, and reduce 90–100% of tetrahydroanthraquinone. U.S. Pat. No. 4,514,376 proposed the superiority of a process using tetrahydroanthraquinone alone as the reduction medium, and disclosed a method for increasing the concentration of tetrahydroanthraquinone in working solution to be supplemented.

It is generally known in, for example, Ind. Eng. Chem. Process Des. Dev. 1983, 22, 150–153 that when a working solution containing a mixture of tetrahydroanthraquinone and anthraquinone is subjected to reduction, tetrahydroanthraquinone, which is easily reduced, is reduced predominantly and no reduction of anthraquinone takes place until the total amount of tetrahydroanthraquinone is reduced. Each of the above-mentioned literatures disclosed a process in which a working solution containing a mixture of tetrahydroanthraquinone and anthraquinone is used but only tetrahydroanthraquinone of easy reducibility is reduced by controlling the reduction level below the content of tetrahydroanthraquinone, i.e. a process utilizing tetrahydroanthraquinone alone as the medium for hydrogen peroxide production.

However, the processes disclosed in the above literatures, for producing hydrogen peroxide by utilizing tetrahydroanthraquinone alone as the reaction medium and by subjecting it to reduction and oxidation, have a problem that the oxidation rate of tetrahydroanthrahydroquinone is low. Hence, German Patent No. 2003268 pointed out that when tetrahydroanthraquinone is used as a reaction medium, an extremely large energy is required in the oxidation step and more than half of the total energy required for the cyclic process is consumed in the oxidation step, and proposed an improved apparatus for increasing the efficiency of the oxidation step. Also, for increasing the efficiency of the oxidation step, U.S. Pat. No. 3,323,868 disclosed an oxidation apparatus of special shape and U.S. Pat. No. 3,073,680 disclosed a sparger ring of special shape used for blowing air into an oxidation apparatus. Each of these proposals or disclosures, however, requires a special apparatus in the oxidation step and consumes a large energy, and consequently has large problems in apparatus and economy aspects.

In order to overcome these problems, techniques were proposed in which anthrahydroquinone of high oxidation rate is utilized as the reaction medium for hydrogen peroxide production, in place of tetrahydroanthrahydroquinone. Japanese Patent Publication No. 3573/1962 proposed a technique in which the content of tetrahydroanthraquinone in working solution is controlled at 10% or less, preferably 5% or less of the total content of anthraquinones in working solution and as a result only anthraquinone is used as the reaction medium. U.S. Pat. No. 2,739,042 proposed a process in which the content of tetrahydroanthraquinone in working solution is controlled at 5% or less of the total content of anthraquinone in working solution for an economical reason.

When anthraquinone alone is used as the reaction medium, however, its reduction product (i.e. anthrahydroquinone) generally has a low solubility in organic solvent, as compared with tetrahydroanthrahydroquinone; consequently, there is a limit in increasing the concentration of anthrahydroquinone in working solution and accordingly there is a limit in the amount of hydrogen peroxide produced per one cycle of working solution. In order to solve this problem, Japanese Patent Publication No. 15777/1960 disclosed a process using, as the reaction medium, a mixture of alkylanthraquinones (the alkyl is a secondary amyl group and a tertiary amyl group) to increase the solubility of amylanthrahydroquinones formed in the reduction step.

In summary, in the conventional processes for producing hydrogen peroxide by subjecting a working solution containing anthraquinones, to reduction and oxidation alternately, only either of anthraquinone and tetrahydroanthraquinone has been used as a substantial reaction medium. Any of the known literatures regarding the conventional processes makes no mention of the advantages brought about by the present process which comprises reducing, in the reduction step, the total amount of tetrahydroanthraquinone and further even anthraquinone and controlling the content of anthrahydroquinone formed, at a level higher than the content of tetrahydroanthrahydroquinone formed.

PROBLEMS TO BE SOLVED BY THE INVENTION

In the prior art, when tetrahydroanthraquinone is used as the reaction medium, the conditions in the oxidation step must be intensified, which requires a very large energy and is disadvantageous economically.

Meanwhile, when anthraquinone is used as the reaction medium, the solubility of anthrahydroquinone in organic solvent is relatively low, which makes it difficult to produce a sufficient amount of hydrogen peroxide per one cycle of working solution.

MEANS FOR SOLVING THE PROBLEMS

The present inventors made an extensive study to solve the above problems present in the process for producing hydrogen peroxide by subjecting a working solution containing anthraquinones, to reduction and oxidation alternately. As a result, the present inventors found that hydrogen peroxide can be produced efficiently economically by using, as the reaction medium, a mixture of tetrahydroanthraquinone and anthraquinone and conducting the reduction step so that the content of anthrahydroquinone formed becomes higher than the content of tetrahydroanthrahydroquinone formed.

The object of the present invention is to provide a process for producing hydrogen peroxide by subjecting a working solution containing anthraquinones as the reaction medium, to reduction and oxidation alternately, which process is characterized in that (1) the anthraquinones as the reaction medium contained in the working solution are a mixture of an alkyl-substituted anthraquinone and an alkyl-substituted tetrahydroanthraquinone, (2) in the reduction step, the total amount of the alkyl-substituted tetrahydroanthraquinone in the working solution and part or the total amount of the alkyl-substituted anthraquinone in the working solution are reduced, and (3) in the working solution after the reduction step, the content of the alkyl-substituted anthrahydroquinone formed is kept higher than the content of the alkyl-substituted tetrahydroanthrahydroquinone formed.

The alkyl-substituted anthraquinone used in the present invention is preferably an alkyl-substituted anthraquinone having a high solubility in the solvent in the working solution. Preferable examples of the alkylanthraquinone are ethylanthraquinone, tert-butylanthraquinone and amylanthraquinone. Sec-amylanthraquinone and tert-amylanthraquinone are particularly preferable. Use of a mixture of a plurality of alkylanthraquinones is also preferable. As mentioned above, in the present invention, these alkyl-subjected anthraquinones are referred to simply as anthraquinone, and alkyl-substituted tetrahydroanthraquinones obtained by tetra-hydrogenation of alkyl-substituted anthraquinone at one of the aromatic nuclei are referred to simply as tetrahydroanthraquinone. Anthraquinone and tetrahydroanthraquinone are used in combination in the present invention.

In the present invention, both of tetrahydroanthraquinone and anthraquinone are reduced and the working solution after the reduction contains different hydroquinones, whereby the total solubility of hydroquinones is increased and the amount of hydrogen peroxide produced per one cycle of working solution can be made large. Further in the present invention, there is used, as the reduction medium for hydrogen peroxide production, anthrahydroquinone of high oxidation rate in an amount larger than that of tetrahydroanthrahydroquinone of low oxidation rate, whereby the overall oxidation rate is increased and the amount of energy consumed in the oxidation step can be made small.

In the present invention, in order to increase the total solubility of hydroquinones, a working solution containing both anthraquinone and tetrahydroanthraquinone is used; in the reduction step, the total amount of tetrahydroanthraquinone is reduced predominantly and then part or the total amount of anthraquinone is reduced; consequently, the working solution is allowed to contain tetrahydroanthrahydroquinone and anthrahydroquinone. As shown in FIG. 1, in a system in which tetrahydroanthrahydroquinone and anthrahydroquinone coexist, the total solubility of the two hydroquinones in the system is higher than the solubility of anthrahydroquinone when anthrahydroquinone alone is contained. By using, as a working solution, such a system in which tetrahydroanthrahydroquinone and anthrahydroquinone coexist, the amount of hydrogen peroxide produced per one cycle of working solution can be made large.

In the present invention, the amount of energy consumed in the oxidation step can be reduced by utilizing, as the reaction medium, mainly anthrahydroquinone of high oxidation rate. In order to enable it, the reduction operation is conducted so as to produce tetrahydroanthrahydroquinone in an amount necessary for supplementing the relatively low solubility of anthrahydroquinone. In the present invention, the reduction of anthraquinones must be conducted so that the working solution after the reduction contains anthrahydroquinone in an amount larger than that of tetrahydroanthrahydroquinone.

The solubility of hydroquinones in working solution varies depending upon the mixing ratio of tetrahydroanthrahydroquinone and anthrahydroquinone in working solution. However, when the concentration of hydroquinones in working solution is too high, the concentration of the aqueous hydrogen peroxide solution partially liberated in the oxidation step is too high, inviting a safety problem. Hence, a mixing ratio giving a preferable solubility is selected in view of safety and economy. The ratio of anthraquinone and tetrahydroanthraquinone in working solution, used in the present invention is controlled preferably at 2:1 to 8:1, more preferably 3:1 to 6:1.

In the present invention, the solvent used for preparation of working solution is not particularly restricted. However, preferable examples of the solvent are a combination of an aromatic hydrocarbon and a higher alcohol, a combination of an aromatic hydrocarbon and a carboxylate of cyclohexanol or an alkylcyclohexanol, and a tetra-substituted urea.

In the present invention, the conditions employed in the reduction step are not particularly restricted. However, the reduction step is generally conducted using hydrogen gas or a hydrogen-containing gas in the presence of a catalyst such as palladium catalyst, platinum catalyst, nickel catalyst or the like at a temperature of 10°–80° C. at a pressure of 1–5 atm. The type of the reactor employed can be any of a fixed bed type, a fluidized bed type, a stirrer-equipped type, etc.

EFFECT OF THE INVENTION

The present process for producing hydrogen peroxide can produce a large amount of hydrogen peroxide in each reduction-oxidation cycle of the working solution and moreover can conduct the oxidation step efficiently and, as compared with the conventional processes, can produce hydrogen peroxide advantageously viewed from the operational and economical standpoints.

EXAMPLES

Figure 1:
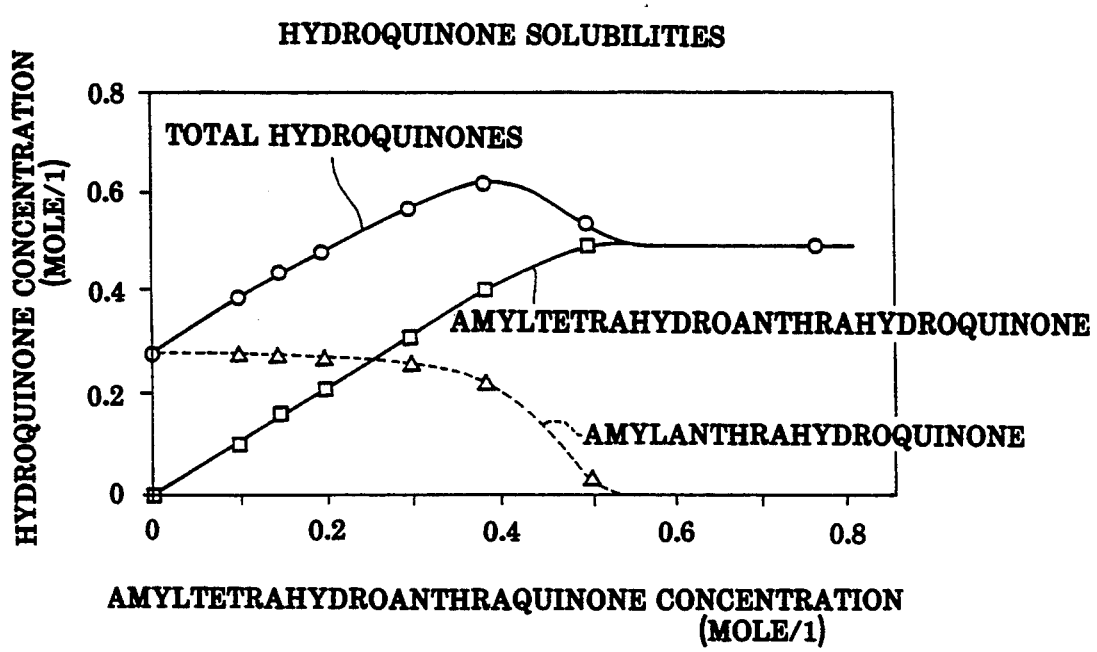
FIG. 1 solubilities of amylanthrahydroquinone, amyltetrahydroanthrahydroquinone and their mixture in a 1.5:1 (by volume ratio) mixed solvent consisting of trimethylbenzene and diisobutylcarbinol.

The present invention is described in more detail by way of Examples and Comparative Examples. In the Examples, the analytical values for the components of each working solution are values obtained by liquid chromatography, unless otherwise specified. The measurement of hydrogen peroxide concentration was conducted by titration using potassium permanganate solution acidified with sulfuric acid.

EXAMPLE 1

The solubilities of hydroquinones in working solution were measured as follows. That is, various working solutions were prepared by using, as the mixed solvent, a 1.5:1 (by volume ratio) mixture of trimethylbenzene and diisobutylcarbinol and, as the solutes, amylanthraquinone and amyltetrahydroanthraquinone. In each of these working solutions, the total concentration of amylanthraquinone and amyltetrahydroanthraquinone was 0.8 mole/l but their proportions were varied. 25 ml of each working solution was placed in a glass vessel; 3 g of a catalyst (1% Pd/Al$_2$O$_3$) was added; the mixture was reacted with hydrogen gas at 40° C. The reaction was lasted until the crystals of amylanthrahydroquinone could be seen in the working solution. After the completion of the reaction, the hydrogen gas in the glass vessel was replaced by nitrogen gas, after which the glass vessel was stoppered, placed in a thermostat and allowed to stand therein at 35° C. for 24 hours. Then, the catalyst and amylanthrahydroquinone crystals in the glass vessel were completely removed by filtration, and the anthrahydroquinones in the filtrate were completely oxidized with oxygen gas to form hydrogen peroxide. The hydrogen peroxide was separated by extraction with water and subjected to concentration measurement. From this measurement were determined the concentrations of anthrahydroquinones present in working solution, and the concentrations were taken as the saturation solubilities of anthrahydroquinones in working solution. The correlation between (1) mixing proportions of amylanthraquinone and amyltetrahydroanthraquinone and (2) anthrahydroquinone solubilities is shown in FIG. 1.

EXAMPLE 2

There was prepared a working solution comprising a 1.5:1 (by volume ratio) mixed solvent of trimetbylbenzene and diisobutylcarbinol, 0.15 mole/l of amyltetrahydroanthraquinone and 0.65 mole/l of amylanthraquinone. 200 ml of this working solution was placed in a glass reactor equipped with baffles and a stirrer. Thereto was added 20 g of 1% Pd/Al$_2$O$_3$ as a catalyst. The reactor inside was replaced by nitrogen gas and then by hydrogen gas. The temperature of the working solution was elevated to 40° C. and stirring was started to initiate a reaction. The reaction was continued until the amount of hydrogen gas consumed for the reaction became 1.8 Nl, while supplying hydrogen gas so that the pressure inside the reactor was kept at normal pressure. During the reaction, the reaction temperature was kept at 40° C. Right after the completion of the reaction, the reaction inside was replaced by argon gas and the working solution was allowed to stand at 35° C. for 1 hour in a hydrogen-free state. In the working solution after the standing, no crystals of anthrahydroquinones were precipitated. The above hydrogenation reaction produced, in the working solution, 0.407 mole/l of anthrahydroquinones (0.15 mole/l of amyltetrahydroanthrahydroquinone and 0.257 mole/l of amylanthrahydroquinone).

Then, the working solution was filtered in an argon atmosphere (the use of this atmosphere prevented the contact of the working solution with air) to remove the catalyst. 100 ml of the filtrate (the working solution after the filtration) was replaced in an oxidation reactor in an argon atmosphere. The oxidation reactor had been filled with argon gas and there was no contact of the working solution with air in the transfer of the working solution into the oxidation reactor. The oxidation reactor was a 200-ml glass reactor of mechanical stirring type, equipped with four baffles, an air inlet tube made of a sintered glass and a waste gas outlet with a cooling tube. Stirring was started at 1,000 rpm and air was supplied at a rate of 5 Nl/min for 10 minutes. Immediately, the stirring and air supply was stopped, and the reactor inside was replaced by argon gas. The oxidation reactor was normal pressure and the oxidation temperature was 35° C. (this temperature control was conducted by dipping the reactor in a thermostat). The working solution after the oxidation reaction was subjected to extraction with water to recover hydrogen peroxide. 1.18 g of a hydrogen peroxide was recovered. The amount of unoxidized anthrahydroquinones was 0.05 mole/l.

COMPARATIVE EXAMPLE 1

Hydrogenation was conducted in the same manner as in Example 2 except that there was prepared a working solution comprising a 1.5:1 (by volume ratio) mixed solvent of trimethylbenzene and diisobutylcarbinol and 0.80 mole/l of amylanthraquinone and comprising no amyltetrahydroanthraquinone. In the working solution after the hydrogenation, crystals of anthrahydroquinone were precipitated.

COMPARATIVE EXAMPLE 2

Hydrogenation and oxidation were conducted in the same manners as in Example 2 except that there was prepared a working solution comprising a 1.5:1 (by volume ratio) mixed solvent of trimethylbenzene and diisobutylcarbinol and 0.80 mole/l of amyltetrahydroanthraquinone and comprising no amylanthraquinone. In the working solution after the hydrogenation, the amount of tetrahydroanthrahydroquinone formed was 0.413 mole/l and no crystals of tetrahydroanthrahydroquinone were precipitated. The amount of hydrogen peroxide recovered after the oxidation was 0.84 g and the amount of unoxidized tetrahydroanthrahydroquinone was 0.161 mole/l.

As is clear from the above results, it is difficult to produce hydrogen peroxide in a large amount in conventional processes (Comparative Examples 1 and 2) owing to the low solubility of amylanthrahydroquinone (Comparative Example 1 using amylanthraquinone alone) and the low oxidation rate of amyltetrahydroanthrahydroquinone (Comparative Example 2 using amyltetrahydroanthraquinone alone). In contrast, in the present process (Example 2), the amount of hydrogen peroxide produced can be made large owing to the synergistic effect by the combination use of amylanthraquinone and amyltetrahydroanthraquinone.

COMPARATIVE EXAMPLE 3

Hydrogenation and oxidation were conducted in the same manners as in Example 2 except that there was prepared a working solution comprising a 1.5:1 (by volume ratio) mixed solvent of trimethylbenzene and diisobutylcarbinol, 0.65 mole/l of amyltetrahydroanthraquinone and 0.15 mole/l of amylanthraquinone. In the working solution after the hydrogenation, the amount of anthrahydroquinones formed was 0.409 mole/l (amyltetrahydroanthrahydroquinone) and no crystals of anthrahydroquinones were precipitated. The amount of hydrogen peroxide recovered after the oxidation was 0.80 g and the amount of unoxidized anthrahydroquinones was 0.170 mole/l.

COMPARATIVE EXAMPLE 4

Hydrogenation and oxidation were conducted in the same manners as in Example 2 except that there was prepared a working solution comprising a 1.5:1 (by volume ratio) mixed solvent of trimethylbenzene and diisobutylcarbinol, 0.30 mole/l of amyltetrahydroanthraquinone and 0.50 mole/l of amylanthraquinone. In the working solution after the hydrogenation, the amount of anthrahydroquinones formed was 0,416 mole/l (amyltetrahydroanthrahydroquinone=0.3 mole/l and amylanthrahydroquinone=0.116 mole/l) and no crystals of anthrahydroquinones were precipitated. The amount of hydrogen peroxide recovered after the oxidation was 1.01 g and the amount of unoxidized anthrahydroquinones was 0.135 mole/l.

Thus, when the amount (0.116 mole/l) of amylanthrahydroquinone formed is smaller than (about 0.38 time) the amount (0.3 mole/l) of amyltetrahydroanthrahydroquinone, the amount of hydrogen peroxide formed is small as compared with the case of Example 2 wherein the amount of amylanthrahydroquinone is about 1.7 times the amount of amyltetrahydroanthrahydroquinone. This is due to the low oxidation rate of amyltetrahydroanthrahydroquinone.

EXAMPLE 3

Preparation of a working solution, hydrogenation and oxidation were conducted in the same manners as in Example 2 except that the mixed solvent in the working solution was a 1.5:1 (by volume ratio) mixture of Ipsol #100 (a high-boiling aromatic hydrocarbon manufactured by Idemitsu Petrochemical Co., Ltd.) and octanol. In the working solution after hydrogenation, the amount of anthrahydroquinones formed was 0.411 mole/l (amyltetrahydroanthrahydroquinone=0.15 mole/l and amylanthrahydroquinone=0.261 mole/l), and no crystals of anthrahydroquinones were precipitated. The amount of hydrogen peroxide recovered after the oxidation was 1.17 g and the amount of unoxidized anthrahydroquinones was 0.06 mole/l.

COMPARATIVE EXAMPLE 5

Hydrogenation was conducted in the same manner as in Comparative Example 1 except that the mixed solvent in the working solution was a 1.5:1 (by volume ratio) mixture Ipsol #100 (a high-boiling aromatic hydrocarbon) and octanol. In the working solution after the hydrogenation, crystals of anthrahydroquinone were precipitated.

COMPARATIVE EXAMPLE 6

Hydrogenation and oxidation were conducted in the same manners as in Comparative Example 2 except that the mixed solvent in the working solution was a 1.5:1 (by volume ratio) mixture of Ipsol #100 (a high-boiling aromatic hydrocarbon) and octanol. In the working solution after the hydrogenation, the amount of tetrahydroanthrahydroquinone formed was 0.402 mole/l and no crystals of anthrahydroquinones were precipitated. The amount of hydrogen peroxide recovered after the oxidation was 0.76 g and the amount of unoxidized tetrahydroanthrahydroquinone was 0.175 mole/l.

COMPARATIVE EXAMPLE 7

Hydrogenation and oxidation were conducted in the same manners as in Example 3 except that there was prepared a working solution comprising a 1.5:1 (by volume ratio) mixed solvent of Ipsol #100 (a high-boiling aromatic hydrocarbon) and octanol, 0.4 mole/l of amyltetrahydroanthraquinone and 0.4 mole/l of amylanthraquinone. In the working solution after the hydrogenation, the amount of anthrahydroquinones formed was 0.415 mole/l (amyltetrahydroanthrahydroquinone=0.4 mole/l and amylanthrahydroquinone=0.015 mole/l) and no crystals of anthrahydroquinones were precipitated. The amount of hydrogen peroxide recovered after the oxidation was 0.88 g and the amount of unoxidized anthrahydroquinone was 0.157 mole/l.

We claim:

1. A process for producing hydrogen peroxide by subjecting a working solution containing anthraquinones as the reaction medium, to reduction and oxidation alternately, which process is characterized in that (1) the anthraquinones as the reaction medium contained in the working solution are a mixture of an alkyl-substituted anthraquinone and an alkyl-substituted tetrahydroanthraquinone, wherein the molar ratio of the alkyl-substituted anthraquinone to the alkyl-substituted tetrahydroanthraquinone in the working solution is 2:1 to 8:1, that (2) in the reduction step, the total amount of the alkyl-substituted tetrahydroanthraquinone in the working solution and part or the total amount of the alkyl-substituted anthraquinone in the working solution are reduced, and (3) in the working solution after the reduction step and before the oxidation step, the content of the alkyl-substituted anthrahydroquinone formed is kept higher than the content of the alkyl-substituted tetrahydroanthrahydroquinone formed.

2. The process set forth in claim 1, wherein the content of the mixture of the alkyl-substituted anthraquinone and the alkyl-substituted tetrahydroanthraquinone in the working solution is below the saturation concentration of the mixture in the solvent in the working solution.

3. The process set forth in claim 1, wherein the content of the mixture of the alkyl-substituted anthrahydroquinone and the alkyl-substituted tetrahydroanthrahydroquinone in the working solution is below the saturation concentration of the mixture in the solvent in the working solution.

4. The process set forth in claim 1, wherein the alkyl-substituted anthraquinone is amyl-substituted anthraquinone.

5. The process set forth in claim 1, wherein the molar ratio of the alkyl-substituted anthraquinone and the alkyl-substituted tetrahydroanthraquinone in the working solution is 3:1 to 6:1.

6. The process set forth in claim 1, wherein the solvent in the working solution is a combination of an aromatic hydrocarbon and a higher alcohol selected from the group consisting of diisobutyl carbinol and octanol.

7. The process set forth in claim 1, wherein the solvent in the working solution is a combination of an aromatic hydrocarbon and a carboxylate of cyclohexanol or an alkylcyclohexanol.

8. The process set forth in claim 1, wherein the solvent in the working solution is a tetra-substituted urea.

9. The process set forth in claim 1, wherein the reduction step for the working solution comprises reducing the working solution with hydrogen gas or a hydrogen-containing gas in the presence of a catalyst at a temperature of 10°–80° C. at a pressure of 1–5 atm.

10. The process set forth in claim 1, wherein the catalyst is a palladium catalyst, a platinum catalyst or a nickel catalyst.

* * * * *